(No Model.)  3 Sheets—Sheet 1.

G. E. MERTZ.
LATHE FOR TURNING WOOD MOLDINGS, &c.

No. 561,720. Patented June 9, 1896.

WITNESSES.
George M Cady.
Henry J. Stapelton.

INVENTOR.
George E. Mertz
by Edwin Salisbury Jones
Attorney (No Model.) 3 Sheets—Sheet 2.
G. E. MERTZ.
LATHE FOR TURNING WOOD MOLDINGS, &c.

No. 561,720. Patented June 9, 1896.

WITNESSES. INVENTOR.
George M Cady. George E. Mertz
Henry J. Stapleton by Edson Salisbury Jones
Attorney (No Model.) 3 Sheets—Sheet 3.

G. E. MERTZ.
LATHE FOR TURNING WOOD MOLDINGS, &c.

No. 561,720. Patented June 9, 1896.

WITNESSES:
M. W. Jones.
J. L. Ward.

INVENTOR:
George E. Mertz,
BY Edson Salisbury Jones.
ATTORNEY.

UNITED STATES PATENT OFFICE.

GEORGE E. MERTZ, OF PORT CHESTER, NEW YORK.

LATHE FOR TURNING WOOD MOLDINGS, &c.

SPECIFICATION forming part of Letters Patent No. 561,720, dated June 9, 1896.

Application filed October 29, 1891. Serial No. 410,271. (No model.)

*To all whom it may concern:*

Be it known that I, GEORGE E. MERTZ, of Port Chester, in the county of Westchester and State of New York, have invented a new and useful Improvement in Lathes for Turning Wood Moldings, &c; and I do hereby declare the following specification, taken in connection with the accompanying drawings, forming a part of the same, to be a description thereof.

This invention relates to a lathe which is particularly adapted to turn wood moldings and articles the pattern or design of which is composed of similar repeated sections.

The object of the invention is to produce a machine which shall at predetermined intervals automatically advance the stick to be turned the distance or amount requisite for a section of the pattern to be produced thereon, then bring up a tool to turn such section of pattern, then retract the tool, and again advance the stick the proper amount, thereby allowing moldings and articles to be turned by the machine without any more attention than is necessary to feed sticks to the machine from time to time.

The invention consists in certain features of construction and arrangement hereinafter described and claimed.

Figure 1:
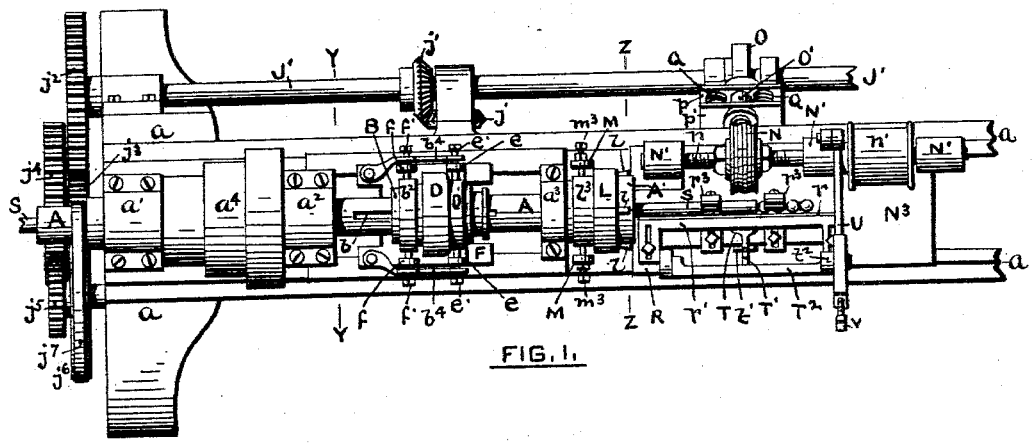
Figure 2:
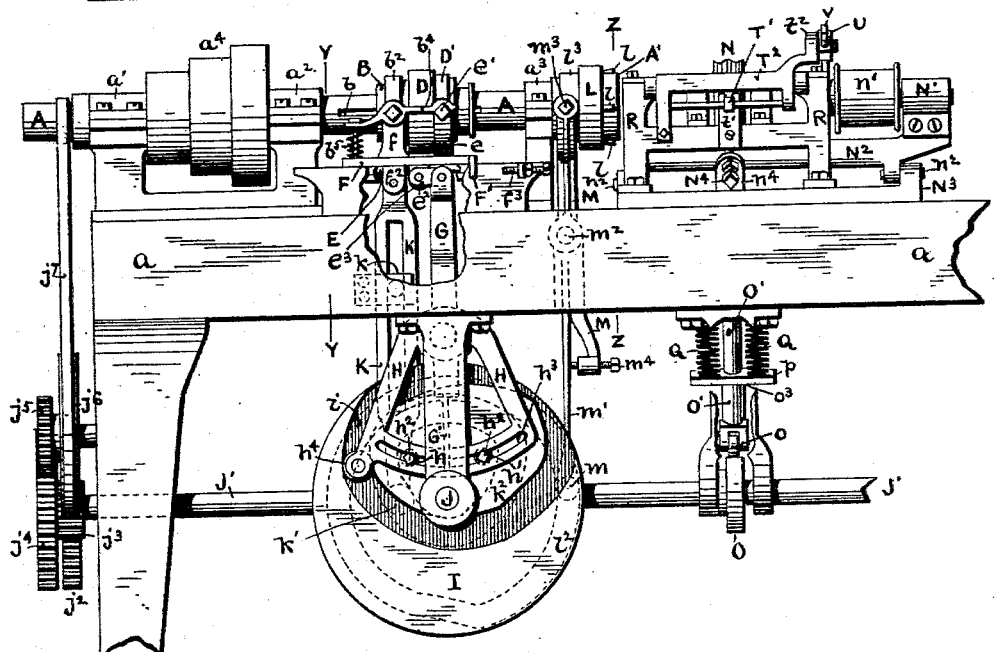
Figure 3:
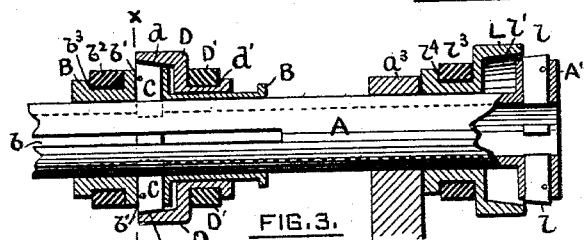
Figure 4:
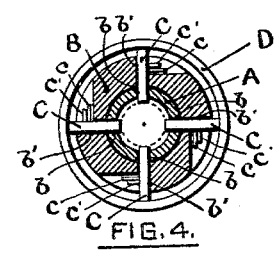
Figures 5, 6:
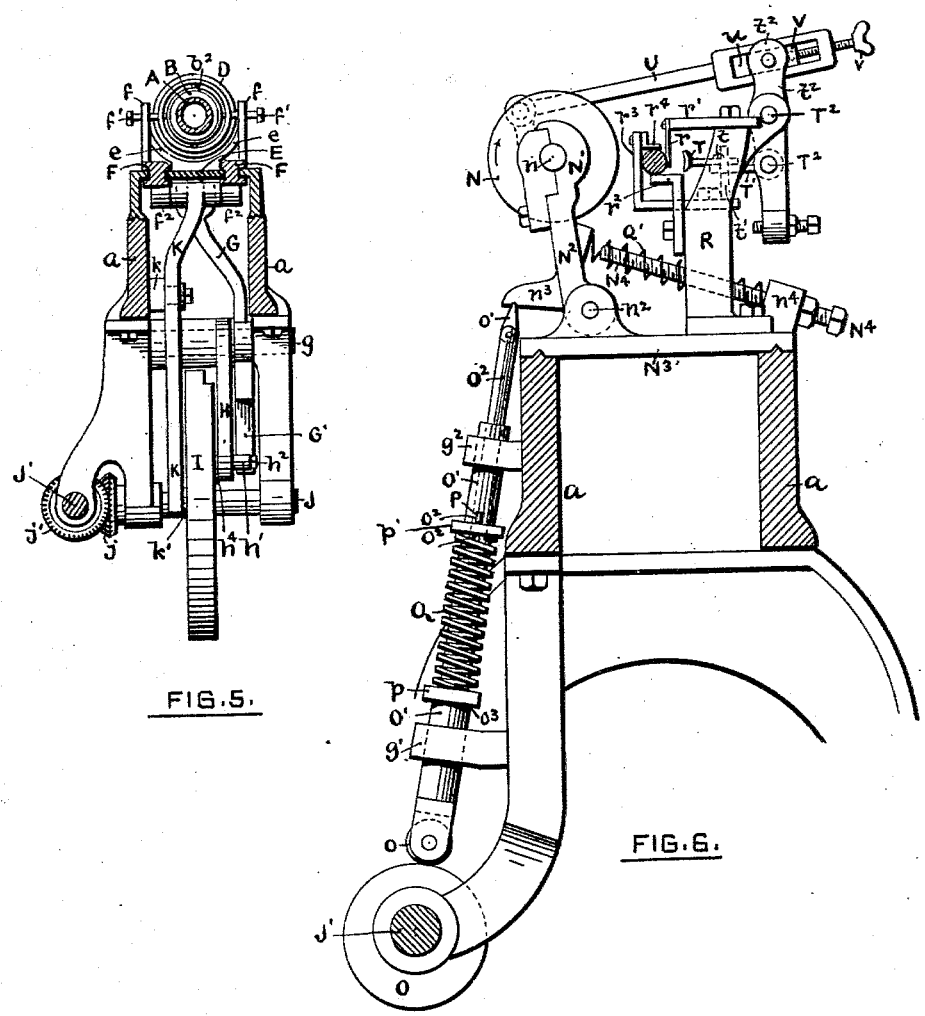
Figure 7:
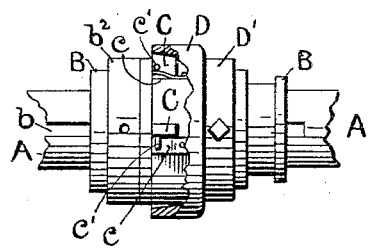
Figure 8:
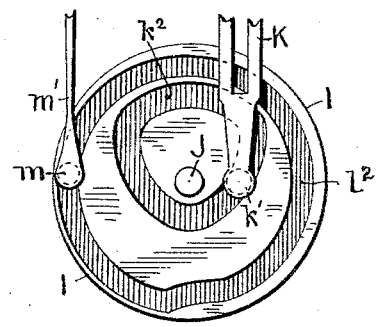

In the drawings, Figure 1 represents a top view of a lathe embodying the invention. Fig. 2 shows a side view of the same with portions cut away. Fig. 3 represents, on an enlarged scale, a portion of the tubular spindle that receives the sticks, with the sleeves, &c., thereon in section. Fig. 4 shows, on an enlarged scale, a transverse section of said spindle on line X X of Fig. 3. Fig. 5 represents a transverse section of the lathe on line Y Y of Figs. 1 and 2, certain catches being removed. Fig. 6 shows, on an enlarged scale, a transverse section of the lathe on line Z Z of Figs. 1 and 2 and an end view of the turning mechanism. Fig. 7 represents, on an enlarged scale, a side view of a portion of the tubular spindle with sleeves thereon, the outer sleeve being partially broken away to show the springs which retract the clutch-fingers. Fig. 8 represents a side view of the cam-disk, the side shown being opposite to that illustrated in Fig. 2.

The frame $a$ of the lathe is provided with three bearings $a'$ $a^2$ $a^3$, in which a tubular spindle A is mounted to turn, the said spindle being furnished with a pulley or cones $a^4$ for revolving it. This hollow spindle acts as a guide or casing to receive the sticks which are fed one by one into its left-hand end, the said sticks being of any convenient length, say from four to twelve feet. After a stick S has been passed into the spindle the stick is to be clutched and automatically advanced the proper distance to enable a section of the pattern to be produced thereon. It is then clamped to the revolving spindle while the turning is being performed and while the advancing mechanism is being retracted.

Upon the spindle is mounted a sleeve B, and the spindle and sleeve are respectively provided with radial slots $b$ $b'$, Figs. 1, 3, and 4, which are occupied by clutch-fingers C. These fingers are normally held in a rearward or outward position in any preferred manner, as by springs $c$, which are secured to the sleeve B and bear upon pins $c'$, projecting laterally from the fingers, as shown in Figs. 4 and 7. The outer ends of the fingers C are to be engaged by the beveled interior face $d$ of a second sleeve D, which is mounted to slide on the sleeve B.

When the sleeve D is slid toward the left hand, Figs. 1 and 3, the clutch-fingers will be moved toward the axis of the spindle A and the stick will be clamped to the revolving spindle. This movement of the sleeve D is accomplished as follows: A plate E, Figs. 2 and 5, has projecting upwardly therefrom two arms $e$ $e$, through which studs $e'$, Figs. 1 and 2, pass into a collar D', that occupies a circumferential groove $d'$ in the sleeve D, as shown in Fig. 3. The plate E is mounted to slide in a block F, Figs. 2 and 5, which is arranged on the lathe-bed. To an ear $e^2$, Fig. 2, projecting downwardly from the plate E, a link $e^3$ is pivoted at one end, and at the other is pivoted to the upper end of a lever G, which lever is pivoted upon a stud $g$, Fig. 5. The lever G is furnished below its pivots with a tailpiece G', which is preferably made yielding, as in the form of a blade-spring, and said tailpiece lies in the path of movement of two studs $h$ $h'$, which are adjustably secured, as by bolts $h^2$, in a segmental slot $h^3$ in a cradle or lever H, mounted to swing on the stud $g$.

The cradle H bears a roller $h^4$, which occupies a groove $i$ in the cam-disk I. This cam is mounted on a transverse shaft J, and is driven through bevel-gears $j\ j'$, Figs. 1 and 5, from a shaft J', to which the gear $j'$ is secured. The shaft J' is provided with a gear $j^2$, Figs. 1 and 2, which meshes with a pinion $j^3$, secured to a gear $j^4$, that meshes with a pinion $j^5$, attached to a pulley $j^6$, and said pulley is driven by a belt $j^7$ passing over the revolving spindle A. The cradle H is rocked by the cam-groove $i$, and the engagement of the stud $h$ with the tailpiece G' swings the lever G and slides the sleeve D toward the left hand, Figs. 1, 2, and 3, thereby closing the clutch-fingers C on the stick. The advancement of the stick is now in order, which is accomplished by a sliding of the sleeve B toward the right hand, carrying the sleeve D with it. The block F is mounted to slide on the lathe-bed, and is furnished with two upwardly-projecting arms $f\ f$, through which studs $f'\ f'$ pass into a collar $b^2$, that occupies a circumferential groove $b^3$, Fig. 3, in the sleeve B. To ears $f^2$ on the block F is pivoted a lever K, Figs. 2 and 5, which is pivoted upon a vertically-adjustable plate $k$, and bears upon its lower end a roller $k'$, that occupies a groove $k^2$ in the cam I, as shown in Fig. 8 and by dotted lines in Fig. 2. After the stick has been clamped by the clutch-fingers C the cam-groove $k^2$ acts to slide the block F, (and with it the sleeves B and D,) and thus advance the stick the desired amount through the spindle A, (the fingers C sliding through the slots $b$,) and beyond the right-hand end of the spindle, in readiness to be clamped by clutch-fingers $l$, Figs. 1, 2, and 3, which are to hold the stick while it is being turned and the advancing mechanism is being retracted. The right-hand end of the spindle is provided with a head A', in which are radially mounted the four clutch-fingers $l$, that pass through the spindle A and are normally held in a rearward position, as are the fingers C, already described. A sleeve L is mounted to slide on the spindle, and its beveled inner surface $l'$ engages the outer ends of the fingers $l$ when the sleeve is slid toward the right and moves them into clamping engagement with the slide. The sleeve is slid by the action of the cam-groove $l^2$ in the cam I, (shown in Fig. 8 and by dotted lines in Fig. 2,) which groove is occupied by a roller or stud $m$ on the tailpiece $m'$ of a lever M. This lever is pivoted at $m^2$ on the frame of the lathe, and through its upper forked end studs $m^3$ pass into a collar $l^3$, that occupies a groove $l^4$, Fig. 3, in the sleeve L. Preferably the tailpiece $m'$ of the lever M is made yielding, (as in the form of a blade-spring,) and an adjusting-screw $m^4$, Fig. 2, may be used to regulate the positions of the tailpiece and lever with relation to each other. When the clutch-fingers $l$ have been made to clamp the stick, the clutch of the fingers C on the stick is released by the movement of the cradle H toward the left hand, which brings the stud $h'$ into engagement with the tailpiece G' of the lever G and slides the sleeve D toward the right hand, thereby allowing the springs $c$ to open the said fingers. The cam-groove $k^2$ now acts upon the lever K to slide the block F toward the left hand (the block carrying with it the sleeves B and D) as much as it was slid toward the right hand when the stick was advanced, in readiness to move the stick forward again at the proper time. After the turning of the section of the pattern has been completed the fingers C are again closed on the stick and it is again advanced in the same manner as hereinbefore described. In order to prevent the possibility of the sleeve D jarring loose during these right-hand movements of the sleeve B D, a catch or catches $b^4$, Figs. 1 and 2, which can be pivoted upon the stud or studs $f'$, may be made to lock over the stud or studs $e'$ by the force of a spring or springs $b^5$, Fig. 2.

If desired, means may be employed to limit the right-hand movement of the block F, so that a nice adjustment of the position of the plate $k$, upon which the lever K is pivoted, will not be necessary. Such means may consist of a lug F' on the block F, Fig. 2, and a set-screw $f^3$, passing through a lug on the frame $a$. The throw of the lever K tending to move the block F slightly beyond this screw there will be sufficient give or spring to said lever to prevent breakage.

The turning of the stick to produce the pattern thereon is done by a rotary tool N of the proper form, Figs. 1, 2, and 6, which is mounted on a shaft $n$, having a pulley $n'$, which may be driven from a counter-shaft. The shaft $n$ is mounted to turn in bearings N' on a yoke or frame N$^2$, which is pivoted at $n^2$ to rock on a block N$^3$, located upon the lathe-bed, so the cutter can swing in and out. A cam O on the shaft J' engages a roller $o$ on the lower end of a rod O' O$^2$, which slides in bearings $g'\ g^2$ and preferably has upon its upper end a pivoted finger $o'$, which engages a nose $n^3$ on the yoke N$^2$. The cam O acts to move the cutter N up to its work. Provision is preferably made so that the cam O need not be changed when the amount of forward movement of the cutter is to be varied. For this purpose the upper end of the rod O' may be made hollow and the rod O$^2$ pass down into it, and a pin P be passed through a slot $o^2$ in the rod O' and through the rod O$^2$, as shown in Fig. 6. The rod O' is furnished with a shoulder $o^3$, upon which rests a plate $p$, and upon this plate one or more springs Q are arranged, which bear at the upper end against a plate $p'$ and force said plate against the pin P and said pin against the upper end of the slot $o^2$, so that the rods O' O$^2$ move together as one until the forward movement of the cutter is checked. The limit of such forward movement is governed by the pattern being turned, and may be regulated by a screw N$^4$, threaded through an ear $n^4$ on the block N$^3$. When the yoke N$^2$ comes in contact with this screw, the cutter will cease to move inwardly, the rod O² will remain stationary, and the cam O will slide the rod O' upon the rod O², (the slot o² in the rod O' allowing such movement,) and the spring or springs P will be compressed. The cutter may be retracted in any suitable manner, as by a spring Q' bearing against the yoke N² and ear n⁴.

The revolving stick when sufficiently advanced to be acted upon by the cutter is preferably supported against the thrust of the cutter by a plate r, Figs. 1 and 6, secured to a piece r', which is horizontally adjustable on the bracket R, and the stick is preferably supported underneath by one or more plates r², Fig. 6, bolted or secured to said bracket so as to be vertically adjustable. Other adjustable supports, as r³, in front of the stick and r⁴ on top of the stick, may be employed to give it the greatest steadiness.

When the pattern being turned on the stick is such that the stick is greatly reduced in diameter, it is sometimes found desirable to employ a supplemental support against the thrust of the cutter for that portion of the stick being turned to prevent such portion from springing. For this purpose a back-rest T may be provided, which is preferably adjustably secured, as by a screw t, to a finger T', which is pivoted to a rocking bar T², the finger T' sliding through a guide t', fixed to the bracket R, as shown in Figs. 1 and 6. The bar T² is pivoted upon the bracket R and is connected by an arm t² to a rod U, which is pivoted to said arm and to the cutter-yoke N². During the movement of the cutter toward the stick the back-rest T will be moved in the opposite direction an equal amount and will support that part of the stick being turned, and when the cutter is retracted the rest T will be retracted, so as not to interfere with the subsequent advancement of the stick. For the purpose of easily adjusting the position of the rest T with relation to the axis of the stick the upper end of the arm t² may be pivoted to a block V, mounted to slide in a slot u in the arm U, and adjustable in said slot by means of a screw v, which is threaded through the end of the rod U and enters said block, as shown in Fig. 6.

What I claim as my invention, and desire to secure by Letters Patent, is—

1. The combination with the lathe-frame, of the revoluble, hollow spindle A, having slots b: the sleeve B mounted on said spindle and provided with clutch-fingers extending into said slots: the sleeve D mounted on the sleeve B for moving the clutch-fingers toward the axis of the spindle: a lever for reciprocating the sleeve D; another lever for reciprocating the sleeve B; and means for reciprocating said levers, substantially as and for the purposes specified.

2. The combination with the lathe-frame, of the revoluble, hollow spindle A, having slots b, and provided on its delivery end with sliding clutch-fingers l: the sleeve L mounted on the spindle, for moving the clutch-fingers toward the axis of the spindle: the sleeve B mounted on the spindle and furnished with clutch-fingers C extending into the spindle-slots b: the sleeve D mounted on the sleeve B for moving the clutch-fingers C toward the axis of the spindle: a lever for reciprocating the sleeve D; another lever for reciprocating the sleeve B; and means for operating said levers, substantially as set forth.

3. The combination with the lathe-frame, of the revoluble, hollow spindle A, having slots b: the sleeve B mounted on said spindle and provided with clutch-fingers extending into said slots: the sleeve D mounted on the sleeve B: a lever connected with the sleeve D for sliding the same: a cradle H for reciprocating said lever: a lever K connected with the sleeve B for sliding the same: and means for reciprocating the cradle H and lever K, substantially as set forth.

4. The combination with the lathe-frame, of the revoluble, hollow spindle A, having slots b: the sleeve B mounted on the spindle and having clutch-fingers extending into said slots: the sliding block F connected with said sleeve: the plate E mounted to slide in the block F: and the sleeve D mounted on the sleeve B and connected with the plate E, substantially as set forth.

5. The combination with the lathe-frame, of the revoluble, hollow spindle A, having slots b: the sleeve B mounted on the spindle and having clutch-fingers extending into said slots: the sliding block F connected with said sleeve: a stop for positively limiting the forward movement of said block: a plate E mounted to slide in the block F: and the sleeve D mounted on the sleeve B and connected with the plate E, substantially as set forth.

6. The combination with the hollow spindle A, having slots b: the sleeve B mounted thereon and having clutch-fingers extending into said slots: the sleeve D mounted on the sleeve B: the lever G connected with the sleeve D: the cradle H having adjustable studs h h', for reciprocating the lever G: and a cam for swinging the cradle, substantially as set forth.

7. The combination with the hollow spindle A, having slots b: the sleeve B mounted thereon and having clutch-fingers extending into said slots: the sleeve D mounted on the sleeve B: the lever G connected with the sleeve D and having a yielding tailpiece G': the cradle H having adjustable studs h h' for reciprocating the lever G; and a cam for swinging the cradle, substantially as set forth.

8. The combination with the lathe-frame, of the hollow spindle A, having slots b: the sleeve B mounted thereon and provided with clutch-fingers extending into said slots: the sleeve D mounted on the sleeve B for closing said fingers: and a catch or catches for locking the sleeve D to the sleeve B, substantially as and for the purposes specified.

9. The combination with the lathe-frame, of the swinging cutter-yoke $N^2$: the rotary cutter N mounted therein: the movable back-rest T connected with a swinging frame $T^2$: and the rod U connected with said frame and the cutter-yoke, substantially as and for the purposes specified.

10. The combination with the lathe-frame, of the swinging cutter-yoke $N^2$: the rotary cutter N mounted therein: the movable back-rest T: a swinging frame $T^2$ with which said rest is connected: a rod U connected at one end to the cutter-yoke and provided with a slot $u$: a block V mounted to slide in said slot and connected to the frame $T^2$: and a screw for adjusting said block in the slot, substantially as and for the purposes specified.

11. The combination with the lathe-frame, of the swinging cutter-yoke $N^2$: the rods $O'$ $O^2$, the former having a slot $o^3$ and the latter engaging the cutter-yoke: a pin P passing through the slot $o^2$ and rod $O^2$: and a spring or springs for holding the said pin against the upper end of said slot and means for raising the rod $O'$, substantially as and for the purposes specified.

12. The combination with the lathe-frame, of the swinging cutter-yoke $N^2$: the rod $O^2$ having upon its upper end a pivoted finger $o'$ engaging the yoke: the rod $O'$ encompassing the lower end of the rod $O^2$, and having a slot $o^2$: a pin P passing through said slot and the rod $O^2$: the plates $p$ $p'$, the former resting on a shoulder on the rod $O'$: and a spring or springs bearing upon said plates and holding the pin P in contact with the upper end of the slot $o^2$, and means for raising the rod $O'$, substantially as set forth.

GEO. E. MERTZ.

Witnesses:
EDSON SALISBURY JONES,
JAMES H. McCULLOUGH.